3,644,307
ALKENE STYRENE POLYMERS
Giovanni Biale, Placentia, Calif., assignor to Union Oil
Company of California, Los Angeles, Calif.
No Drawing. Filed Aug. 19, 1969, Ser. No. 851,475
Int. Cl. C08f *1/13, 1/16*
U.S. Cl. 260—80.73                                9 Claims

ABSTRACT OF THE DISCLOSURE

A low molecular weight alkene such as ethylene is copolymerized with styrene by a low pressure emulsion or suspension polymerization by incorporating a water soluble olefin complexing agent in the aqueous medium used in the polymerization. In a typical embodiment, ethylene is contacted with an aqueous emulsion of styrene, a peroxide catalyst and an ethylene complexing agent which is a water soluble salt of a multivalent metal. The polymerization can be performed at mild conditions of temperatures from about 10° to about 200° F. and pressures from about 10 to about 100 atmospheres. Other comonomers can be included to prepare terpolymers of ethylene, styrene and desired other monomers. The products have improved properties over polystyrene.

DESCRIPTION OF THE INVENTION

The invention relates to the polymerization of styrene in aqueous media and in particular relates to the emulsion and suspension copolymerization techniques of styrene.

Polystyrene is a significant polymer of commerce and is used in large volumes for many applications. The polymer has some disadvantages such as poor impact resistance and structural strength so that polystyrene is commonly blended with a polyolefin to improve the latter properties. While it would be more desirable to copolymerize styrene with a low molecular weight alpha olefin, particularly ethylene, so as to achieve improvement in impact resistance and structural deflection, heretofore no simple method for the copolymerization of ethylene and styrene has been devised. The copolymerization desirably should be capable of being performed at mild conditions including relatively low pressures from about 10 to about 100 atmospheres and should achieve the incorporation of from about 1 to about 20 percent of the low molecular weight hydrocarbon alpha olefin in the final polymer. The resulting product is basically a polystyrene modified by the presence of the alpha olefin polymer units which impart impact resistance and flucturable deflection to the polymer.

I have now found that ethylene and low molecular weight alpha olefins can be incorporated into styrene polymers to produce a copolymer thereof using emulsion or suspension polymerization techniques by the incorporation of a water soluble complexing agent for the alpha olefin in the aqueous polymerization medium. The complexing agent employed for this purpose is a water soluble salt or complex of a multivalent metal. The copolymerization of the alpha olefin and styrene can then be accomplished using relatively mild conditions of temperatures from about 10° to 250° F., preferably from about 50° to 150° F., and most preferably from about 75° to 125° F. Pressures which can be used are from 10 to about 100 atmospheres, preferably from about 25 to 75 atmospheres.

The invention is applied to the otherwise conventional emulsion or suspension polymerization techniques for the preparation of polystyrene and its various copolymers and interpolymers. In these techniques, an aqueous reaction medium is employed in which the styrene is dispersed. In the suspension techniques the styrene is dispersed with the aid of various inorganic or organic solid suspending agents while in the emulsion system the styrene is dispersed with the aid of various surface active agents. The suspension polymerization technique employs an oil soluble free radical catalyst such as a diacyl peroxide, hydroperoxide, etc., while the emulsion polymerization technique employs a water soluble catalyst, e.g., a persulfate or a peroxide-redox initiator. Both techniques employ a stirred polymerization reactor with means to cool the reaction medium and maintain the desired polymerization temperature. On completion of the polymerization the polymer can be recovered by filtration from the suspension technique or from the mulsion latex after treatment to break the emulsion. Alternatively, the product of the emulsion polymerization can be employed as a latex composition, e.g., as a coating composition in paints, adhesives, etc.

Regardless of the particlular technique employed, the invention comprises incorporating a water soluble alpha olefin complexing agent in the aqueous polymerization medium and thereafter contacting the polymerization medium with the low molecular weight hydrocarbon alpha olefin so as to form a complex with the complexing agent and induce copolymerization upon initiation of the reaction. The various hydrocarbon alpha olefins that can be copolymerized with styrene in this fashion include ethylene, propylene, butene-1, isobutylene, pentene-1, etc. This group of monomers includes the $C_2$–$C_5$ hydrocarbon alkenes having the unsaturated bond in the alpha position. Of these, ethylene and propylene are preferred and ethylene is most preferred.

The copolymerization can also be performed in the presence of other comonomers which readily undergo polymerization with styrene in suspension or emulsion techniques. Examples of suitable comonomers include vinyl chloride, vinylidene chloride, chloroprene, isoprene, butadiene, isobutylene, butene-1, pentadiene, hexene, alpha-methylstyrene, beta-methylstyrene, chlorostyrene, divinylbenzene, acrylic, methacrylic, maleic, fumaric, itaconic acids, as well as their $C_1$–$C_6$ alkyl esters thereof, e.g., methyl acrylate, ethyl methacrylate, diisobutylmaleate, diisopropylfumarate, dimethylitaconate, etc. The various nitriles can also be copolymerized such as acrylonitrile, methacrylonitrile, etc. as well as the amides, e.g., acrylamide, methacrylamide, etc. Vinyl ethers such as $C_1$–$C_6$ alkyl vinyl ethers, e.g., methyl vinyl ether, ethyl vinyl ether, isopropyl vinyl ether, butyl vinyl ether, cyclohexyl vinyl ether, etc. can also be copolymerized.

The polymerization is carried out by either of the suspension or emulsion techniques. In these techniques, the polymerization is performed in an aqueous polymerization medium generally under batchwise conditions, however, continuous processing can be employed if desired. The reactor used for both techniques can be a jacketed kettle having stirring means. A cooling medium is circulated through the jacket of the kettle to maintain the desired temperature and the aqueous medium is stirred to maintain the dispersion of the styrene in the aqueous medium. In the suspension technique, the monomer is added to the aqueous polymerization medium with a suspending agent and a suitable, oil-soluble, catalyst for the polymerization. The pH of the aqueous medium can be controlled by the addition of various buffering agents. In the emulsion technique, a similar recipe is used, however the suspending agent is replaced with a suitable emulsifying agent and a water soluble free radical initiator is used instead of the oil soluble catalyst employed in the suspension technique.

In the suspension technique the suspending agent is used in amounts from about 1 to about 10 weight percent of the monomers in the aqueous medium and can comprise various and commonly known dispersing agents such as finely divided particles of tricalcium phosphate, trimagnesium phosphate, tribarium phosphate, calcium oxalate, titanium oxide, zinc oxide, zinc sulfide, clays, e.g., attapulgite, bentonite, silica gel, etc. Various organic solid dispersants can also be used such as water soluble polyvinyl alcohol, alkali metal or ammonium salts of sulfonated polystyrene, hydroxyethyl cellulose, carboxymethyl cellulose, water soluble interpolymers of acrylic acid and 2-ethylhexylacrylate, gelatin, copolymers of acrylamide and acrylic acid, partially hydrolyzed polyacrylamide having from 10 to 70 percent of its amide groups as carboxylic acid or alkali metal carboxylate groups, etc.

In the emulsion polymerization technique, the styrene is dispersed throughout the polymerization medium by the use of an emulsifying agent. The amount employed depends somewhat on the efficiency of the particular emulsifying agent and is from about 0.1 to about 10, preferably from about 1 to about 5, weight percent of the monomers in the aqueous polymerization medium. The emulsifying agents that can be used include the anionic, cationic and nonionic emulsifying agents which are well known and commonly used. Examples of various suitable emulsifying agents include the following: anionic compounds obtained by sulfonation of fatty derivatives such as sulfonated tallow, sulfonated vegetable oils, sulfonated marine animal oils, sulfonated fatty acid esters of mono- and polyvalent alcohols are also suitable such as the sulfonated butyl ester of abietic acid, sulfonated polyolglycerides, etc. Sulfated and sulfonated fatty alcohols can also be used such as sodium lauryl sulfate, sodium cetyl sulfate, sodium oleyl sulfate, sodium tetradecyl sulfonate, ammonium reptadecyl sulfonate, etc.

The nonionic oil-in-water emulsifiers can also be used such as ethylene oxide condensation products with fatty acids such as lauric acid, oleic acid, stearic acid, etc. Ethylene oxide condensation products with fatty and rosin alcohols are also suitable such as polyoxy ethylene lauryl ether, the ethylene oxide condensate of hydroabietyl alcohol, etc. Other examples include ethylene oxide condensates with alkyl and alkenyl phenols such as the ethylene oxide condensate with dodecyl and isododecyl phenol, octyl phenoxy polyethoxyethanol, etc. Other ethylene oxide condensation products include those with fatty amines and amides having from about 8 to 18 carbons, as well as the fatty acid partial esters of hexatans, e.g., polyoxethylene derivatives of sorbitan monolaurate, sorbitan monopalmitate, sorbitan monostearate, sorbitan monooleate, sorbitan trioleate, etc.

Oil soluble free radical initiators are used as a catalyst for the suspension polymerization. Examples of suitable catalysts include the diacyl peroxides, e.g., dibenzoyl peroxide, dilauroyl peroxide, diphthaloyl peroxide, dicyclohexyl peroxide, di-t-butyl peroxide, phenyl cyclohexyl peroxide, dicumenyl peroxide, cumene hydroperoxide, etc. Various organic soluble azo compounds can also be used such as azobisisobutyronitrile, azobisisopropylnitrile, gamma, gamma-azobis(p - quanotoluene) methylazobutyronitrile, etc.

The emulsion system employs various water soluble free radical catalysts such as a water soluble peracid and salts thereof, e.g., hydrogen peroxide, sodium peroxide, lithium peroxide, peracetic acid, persulfuric acid, the ammonium and alkali metal salts thereof, e.g., ammonium persulfate, sodium peracetate, lithium persulfate, potassium peracetate, etc. The free radical catalyst can be used alone or in combination with a suitable reducing agent in a redox couple. The reducing agent is typically a salt of a multivalent metal in a lower oxidation state, e.g., ferrous chloride, cuprous sulfate, etc. or an oxidizable sulfur compound such as an alkali metal meta-bisulfite. The presence of the redox agent in the polymerization medium achieves a release of free radicals at a lower temperature than necessary in the absence of a redox agent and thereby promotes formation of higher molecular weight copolymer products.

Regardless of the technique employed, the catalysts or initiators are used in a concentration from about 0.01 to about 2, preferably from about 0.1 to about 0.5 weight percent of the monomers in the aqueous polymerization medium. The catalyst can be charged to the reactor initially in the entire quantity needed to perform the polymerization or can be added continuously over an extended period, thereby maintaining a constant supply of the catalyst concentration. Alternatively, the catalyst can be added initially to the reactor in an amount comprising from about 5 to about 80 percent of the toal necessary for the polymerization and thereafter complete polymerization can be achieved by increasing the concentration of the catalyst by adding the remaining quantity of catalyst. In continuous processing, however, it is obvious that the catalyst can be continuously added with the monomer or comonomers as the polymerization progresses.

The concentration of the monomers in the reaction medium can comprise from about 25 to about 75, preferably from about 45 to about 60, weight percent of the polymerization medium. The relative ratios of the styrene to the comonomer used when forming a terpolymer can be widely varied depending upon the desired composition of the final terpolymer. Ratios of styrene to any of the aforementioned monomers can be from about 1 to about 100; preferably from about 5 to about 50 weight parts per part of other monomer.

The copolymerization according to the invention includes the incorporation of a water soluble olefin complexing agent in the aqueous polymerization medium. The olefin complexing agent comprises any of the multivalent metals which can be incorporated as water soluble salts or as soluble complexes. The salts or complexes of limited solubility can be used when employed in combination with a suitable solubilizing agent such as a water miscible inert reaction medium. Examples of suitable water soluble organic liquids that can be used as co-solvents include the low molecular weight alkanoic acids, e.g., acetic, propionic, butyric, isobutyric acids, etc.; the low molecular weight alkanols, e.g., ethanol, isopropanol, butanol, etc.; the low molecular weight glycols and glycerols, e.g., ethylene glycol, propylene glycol, glyceryl, 1,2,3-butanetriol, 1,3,5-pentenetriol, etc.; the hydroxy and amino-substituted alkanoic acids, e.g., glycolic acid, hydroxy propionic acid, hydroxy valeric acid, glycine, amino propionic acid, etc.

Metals which readily form complexes with ethylene and low molecular weight hydrocarbon alpha olefins can be used as the complexing agent in this invention. These metals include any of the metals which in their ionic state have available orbitals of $\pi$-symmetry, i.e., the d and p orbitals. The metal is the donating component of the complex so any metal which in the ionic form can donate at least one electron from d and p orbitals can be used. These metals include metals of Groups I–B, copper, silver gold; II–B, zinc, cadmium, mercury; III–A, gallium, indium, thallium; cerium of Group III–B; IV–A, germanium, tin and lead; IV–B, titanium, zirconium, hafnium; V–A, antimony, bismuth; V–B, vanadium, niobium tantalum; VI–B, chromium, molybdenum, tungsten; VII–B, manganese, technetium, rhenium, VIII including the iron group comprising iron, cobalt and nickel, palladium subgroup including ruthenium, rhodium and palladium and the platinum subgroup including osmium, iridium and platinum. Of the aforementioned, the Group VIII metals are preferred and of these the Group VIII noble metals are most preferred.

The metal complexing agent can comprise a water soluble salt or complex of the aforementioned metals. Examples of suitable salts include the water soluble salts of the hydrohalide acids, e.g., the chlorides, fluorides, bromides or iodides; the sulfates, nitrates, low molecular weight alkanoates, e.g., acetates, formates, propionates, butyrates, valerates, etc. The metal can also be complexed with various complexing or chelating agents and when these are employed, any of the aforementioned cosolvents can be used to achieve solubility in the system. Examples of the carbonyl, trihydrocarbyl phosphines or phosphites, e.g., triphenylphosphine, tri-n-butylphosphine, triphenylphosphite, triethylphosphite, tritolylphosphine, tricyclohexylphosphine, etc. Various chelating agents can also be used such as the well known diketone alkanes, e.g., 1,3-pentanedione, 2,4-pentanedione, 3,5-hexanedione, etc.; the alkylenediamines and their N,N-substituted alkyl derivatives thereof, e.g., ethylene diamine, tetramethylethylenediamine, tetrabutylethylenediamine, trimethylenediamine, tetramethylenediamine, etc. Other suitable chelating agents include the various alpha-hydroxy carboxylic acids, e.g., citric acid, glycolic acid, alpha-hydroxybutyric acid, glyceric acid, tartaric acid, etc. Other complexing agents include the various cyclodienyl ligands such as cyclopentadienyl, tetraphenylcyclobutadienyl, etc.

Examples of various complexing agents which can be incorporated in the reaction medium include any of the following: zinc acetoacetonate, ammonium tetrabromotitanate (II), potassium tetrathiocyanomercurate (II), vanadium hexacarbonyl, chromium hexacarbonyl, molybdenum hexacarbonyl, iron pentacarbonyl, ferrocene, sodium dicyanocuprate, niobium trichloride, molybdenum trichloride, dibenzyl chromium chloride, bis(cyclopentadienyl) palladium, carbonyl tris(triphenylphosphine) rhodium hydride, chlorobis(tri-n-butylphosphine)iridium chloride, palladium cyanide, silver acetate, mercuric acetate, nickel naphthanate, cerium chloride, molybdenum naphthanate, potassium tetracyanoplatinate, silver nitrate, stannous chloride, bistriphenylphosphine palladium dichloride, tris-triphenylphosphine rhodium chloride, cerium sulfate, titanium boride, rhenium hexacarbonyl, vanadium hexacarbonyl, cobalt titanate, cadmium cyanide, thallium acetate, cupric acetoacetonate, manganese acetoacetonate, ruthenium acetoacetonate, etc.

The complexing agent can be incorporated in the aqueous polymerization medium in an amount from about 0.05 to about 5, preferably from about 0.2 to about 1 weight percent of the reacting monomers. When complexing agents of limited solubility are used such as the organic chelates as well as the carbonyls of the metals, the aforementioned organic cosolvents can be used in amounts from about 1 to about 50, preferably from about 5 to about 25 weight percent of the aqueous polymerization medium so as to effect solubility of the complex.

The invention will now be described by reference to illustrated modes of practice thereof which will also serve to demonstrate results obtainable thereby.

EXAMPLE 1

In the mode of practice, a steel bomb of about 450 milliliters capacity is charged with the aqueous reaction medium which comprises 100 milliliters water, from 1 to 3 grams of an emulsifying agent, from 0.2 to 0.5 gram of a water soluble persulfate catalyst, typically potassium persulfate, and from 50 to 100 grams of styrene. The bomb is then pressured to 200 p.s.i.g. with ethylene and placed in a water bath maintained at 150° F. and tumbled therein at 12 r.p.m. for a period of 16 hours. Upon completion of this reaction period the aqueous polymerization medium is removed and admixed with an aqueous solution of sodium chloride to precipitate the polymer from the latex. The polymer is filtered from the aqueous medium, washed and dried, and the amount of ethylene incorporated in the polymer is determined by nuclear magnetic resonance analysis. The following tables summarize the results obtained by use of the aforementioned quantities of the indicated complexing agent which was also incorporated in the aqueous polymerization medium.

TABLE 1

| | Complexing agent | Grams | Copolymer weight percent ethylene |
|---|---|---|---|
| 1 | None | 0 | 0 |
| 2 | Silver acetate | 0.3 | 6.8 |
| 3 | do | 0.15 | 4.5 |
| 4 | Nickel naphthenate | 0.3 | 3.6 |
| 5 | Mercuric acetate | 0.3 | 4.4 |
| 6 | Molybdenum naphthenate | 0.3 | 2.5 |
| 7 | Bis(benzene)chromium | 0.3 | 4.1 |
| 8 | Potassium tetracyanoplatinate | 0.3 | 2.6 |
| 9 | Cyclopentadienyl iron carbonyl iodide | 0.3 | 1.8 |
| 10 | Bis(triphenylphosphine) palladium chloride | 0.3 | 7.7 |
| 11 | Tris(triphenylphosphine) rhodium chloride | 0.3 | 4.0 |
| 12 | Cerium sulfate | 0.3 | 1.2 |
| 13 | Titanium boride | 0.3 | 1.8 |
| 14 | Palladium chloride | 0.2 | 3.8 |
| 15 | Cerium chloride | 0.3 | 3.2 |
| 16 | Molybdenum hexacarbonyl / Sodium borohydride | 0.3 / 0.1 | 1.4 |
| 17 | Rhenium hexacarbonyl | 0.3 | 4.1 |
| 18 | Vanadium hexacarbonyl | 0.3 | 4.2 |
| 19 | Cobalt titanate [1] | 0.3 | 3.4 |
| 20 | Cadmium cyanide [1] | 0.3 | 7.9 |
| 21 | Cadmium cyanide / Sodium carbonate / Sodium bicarbonate | 0.3 / 0.25 / 0.25 | 9.2 |
| 22 | Thallium acetate [1] | 0.3 | 6.5 |
| 23 | Manganese acetylacetonate / Amyl bromide [1] | 0.2 / 0.2 | 2.4 |
| 24 | Manganese acetylacetonate / Glycine [1] | 0.2 / 0.2 | 5.7 |
| 25 | Chromium hexacarbonyl [1] | 0.3 | 3.4 |
| 26 | Cobalt acetylacetonate / Triphenylphosphine [1] | 0.3 / 0.3 | 3.6 |
| 27 | Palladium cyanide [1] | 0.5 | 4.2 |

[1] 250 p.s.i.g. of ethylene pressure.

EXAMPLE 2

In the following experiments the polymerization is repeated, however varied amounts of other comonomers were incorporated in the reaction medium to produce terpolymers. In these examples the reaction is repeated substantially identical to that of the preceding example, however 250 p.s.i.g. of ethylene is employed together with the indicated amounts of other comonomers. The following results were obtained:

TABLE 2

| | Complexing agent | Grams | Terpolymer, (weight percent) Ethylene, percent | Other monomer |
|---|---|---|---|---|
| 1 | None | 0 | 0 | Acrylonitrile, 15%. |
| 2 | Cadmium cyanide | 0.3 | 5 | Acrylonitrile, 16%. |
| 3 | Thallium acetate | 0.2 | 5 | Do. |
| 4 | Cadmium cyanide | 0.3 | 2 | Acrylamide [1]. |
| 5 | do | 0.3 | 2 | Ethyl acrylate, 15%. |
| 6 | Cadmium cyanide / Sodium carbonate / Sodium bicarbonate | 0.3 / 0.25 / 0.25 | 6 | Acrylonitrile, 23%. |

[1] Sufficient amount to impart some water solubility to the terpolymer.

The invention has been illustrated by a particular mode of practice. It is not intended that the invention be unduly limited thereby but, instead, it is intended that obvious modifications and equivalents of the invention be included therein.

I claim:
1. A method for the low pressure copolymerization of an olefin selected from ethylene or propylene with styrene which comprises contacting said olefin at a temperature from 10° to 300° F. and a pressure from 10 to 100 atmospheres with an aqueous medium comprising a dispersion of (1) from 25 to 75 weight percent of styrene, (2) one of the class of emulsifying and suspending agents and mixtures thereof in an amount sufficient to maintain said dispersion, (3) from 0.01 to 2 weight percent of said styrene of a free radical catalyst and (4) about 0.05 to about 5 weight percent of the reacting monomers of a water soluble salt or complex of a complexing metal having available p and d electron orbitals and selected from the class consisting of metals of groups I–B, II–B, IV–B, V–B, VI–B, VII–B, VIII, IV–A, and V–A of the Periodic Table, gallium, indium, thallium, and cerium, to form a complex with said hydrocarbon olefin and thereby effect said copolymerization.

2. A method of claim 1 for the emulsion copolymerization wherein an emulsifying agent and a water soluble free radical catalyst is used in said reaction medium.

3. The method of claim 1 for the suspension copolymerization wherein a suspending agent and an oil soluble free radical catalyst is used in said reaction medium.

4. The method of claim 1 wherein said aqueous medium is agitated to maintain said dispersion.

5. The method of claim 1 wherein said copolymerization is effected in the presence of a comonomer selected from the class of acrylonitrile, ethyl acrylate and acrylamide.

6. In the method of the low pressure copolymerization of ethylene with styrene at a temperature of from 10 to about 300° F. and a pressure of from 10 to 100 atmospheres in an aqueous medium in the presence of a free radical catalyst the improvement comprises conducting said copolymerization in the presence of from 0.05 to about 5 weight percent of the reacting monomers of a water soluble salt or complex of a complexing metal having available p and d electron orbitals and selected from the class consisting of Groups I–B, II–B, IV–B, V–B, VI–B, VII–B, VIII, IV–A, and V–A of the Periodic Table, gallium, iridium, thallium and cerium, to form a complex with said hydrocarbon olefin and thereby effect said copolymerization.

7. The method defined in claim 6 wherein said copolymerization is an emulsion copolymerization process wherein an emulsifying agent is present during said copolymerization.

8. The method in claim 6 wherein said complexing metal is silver, mercury, chromium, palladium, rhodium, rhenium, vanadium, cadmium, thallium and manganese.

9. The method defined in claim 6 wherein said complexing metal is a Group VIII noble metal.

References Cited
UNITED STATES PATENTS

| | | | |
|---|---|---|---|
| 2,833,746 | 5/1958 | Haefner | 260—80.5 |
| 2,868,772 | 1/1959 | Ray et al. | 260—94.9 |
| 3,117,945 | 1/1964 | Gorham et al. | 260—45.5 |
| 3,249,594 | 5/1966 | Donat et al. | 260—84.1 |
| 3,386,926 | 6/1968 | Gavoret | 260—2.5 |
| 3,449,311 | 6/1969 | Lowell | 260—93.5 |

JOSEPH L. SCHOFER, Primary Examiner

S. M. LEVIN, Assistant Examiner

U.S. Cl. X.R.

260—78.5 HC, 78.5 R, 80.7, 80.76, 80.78, 88.1 P, 93.5 R, 878 R, 88.2 C